(12) United States Patent
Harrison et al.

(10) Patent No.: US 12,024,914 B2
(45) Date of Patent: *Jul. 2, 2024

(54) CAMPING ASSEMBLY WITH A STORAGE BOX AND A TENT

(71) Applicant: PURPLE LINE LIMITED, Ipswich (GB)

(72) Inventors: Jonathan Harrison, Ipswich (GB); Mark Kidson, Ipswich (GB); Ben Hawkins, Ipswich (GB)

(73) Assignee: Purple Line Limited, Wherstead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,398

(22) Filed: May 24, 2021

(65) Prior Publication Data

US 2022/0010579 A1  Jan. 13, 2022

Related U.S. Application Data

(63) Continuation of application No. 15/999,098, filed as application No. PCT/GB2017/050391 on Feb. 15, 2017, now Pat. No. 11,028,613.

(30) Foreign Application Priority Data

Feb. 17, 2016 (GB) ..................... 1602805
Jul. 21, 2016 (GB) ..................... 1612659

(51) Int. Cl.
*E04H 15/20* (2006.01)
*B60P 3/34* (2006.01)
*E04H 15/06* (2006.01)

(52) U.S. Cl.
CPC .............. *E04H 15/20* (2013.01); *B60P 3/341* (2013.01); *E04H 15/06* (2013.01); *E04H 2015/201* (2013.01)

(58) Field of Classification Search
CPC ......... E04H 15/02; E04H 15/06; E04H 15/20; E04H 2015/201; E04H 2015/206; B60P 3/341
See application file for complete search history.

(56) References Cited

U.S. PATENT DOCUMENTS 2,481,230 A   9/1949  MacDonald
2,502,024 A   3/1950  Morris
(Continued)

FOREIGN PATENT DOCUMENTS

CN        204936923      1/2016
DE    202016000836 U1    3/2016
(Continued)

OTHER PUBLICATIONS

International Search Report and Written Opinion of the International Searching Authority (PCT/GB2017/050391 filed Feb. 15, 2017) dated Jun. 12, 2017, 9 pages.

(Continued)

*Primary Examiner* — David R Dunn
*Assistant Examiner* — Danielle Jackson
(74) *Attorney, Agent, or Firm* — Brown & Brown IP Law PLLC (57) ABSTRACT

The camping assembly 2 may be in the form of a folding camper 10 and comprises a canopy 30 which effectively provides a tent canopy 30 for the folding camper 10. The folding camper 10 also comprises a framework 32 to maintain the tent canopy 30 in a raised configuration in order to provide an accommodation space within the folding camper 10 in the assembled configuration. The framework 32 includes a front frame 34 and a rear frame 36. The front frame 34 comprises three airbeams 41, 42, 43. The three airbeams include a front airbeam 41, an intermediate airbeam 42 and a rear airbeam 43. Each of the airbeams 41, 42, (Continued)

43 comprises a curved or hooped inflatable airbeam. Similarly, the rear frame 36 comprises three airbeams 45, 46, 47. The three airbeams 45, 46, 47 include a front airbeam 45, an intermediate airbeam 46 and a rear airbeam 47. Each of the airbeams 45, 46, 47 comprises a curved or hooped airbeam. The present invention provides a folding camper 10 which is assembled by simultaneously inflating a single airbeam network to put the canopy 30 in tension and to make the canopy 30 taut. The folding camper 10 does not require any auxiliary tensioning system or mechanism for the canopy since this is provided intrinsically by the connection of the lower edge of the canopy around the trailer and due to the geometry of the airbeam network and, in particular, a central longitudinal airbeam.

24 Claims, 7 Drawing Sheets

(56) References Cited

U.S. PATENT DOCUMENTS

| | | |
|---|---|---|
| 3,163,460 A | 12/1964 | Cox |
| 3,307,301 A | 3/1967 | Jacobsohn |
| 3,753,590 A | 8/1973 | Couix |
| 4,332,112 A | 6/1982 | Hsu |
| 5,205,086 A | 4/1993 | Heim |
| 5,247,768 A | 9/1993 | Russo |
| 5,462,330 A | 10/1995 | Brown |
| 5,987,822 A | 11/1999 | McNiff et al. |
| 6,035,875 A | 3/2000 | Chen |
| 8,550,538 B1 | 10/2013 | Brandenburg |
| 9,366,050 B1 | 6/2016 | Ptaszek |
| 10,119,296 B2 | 11/2018 | Deal |
| 10,208,502 B2 | 2/2019 | Currid |
| D851,194 S | 6/2019 | Kidson |
| D864,034 S | 10/2019 | Hill |
| D864,035 S | 10/2019 | Hill |
| D864,036 S | 10/2019 | Hill |
| D864,037 S | 10/2019 | Hill |
| 2002/0083653 A1 | 7/2002 | Hilbert |
| 2002/0163221 A1 | 11/2002 | Smith |
| 2003/0213512 A1* | 11/2003 | Lee .................. E04H 15/20 135/126 |
| 2008/0210282 A1 | 9/2008 | Turcot |
| 2010/0230999 A1 | 9/2010 | Setzer |
| 2017/0058553 A1 | 3/2017 | Day |
| 2019/0352924 A1 | 11/2019 | Currid |

FOREIGN PATENT DOCUMENTS

| | | |
|---|---|---|
| EP | 0036051 | 9/1981 |
| EP | 3 403 877 A1 | 11/2018 |
| FR | 1440788 | 6/1966 |
| GB | 898883 | 6/1962 |
| GB | 2500946 | 9/2013 |
| WO | 99/14454 | 3/1999 |
| WO | 2007/035173 A1 | 3/2007 |

OTHER PUBLICATIONS

GB Search Report (GB1612659.1) dated Dec. 21, 2016, 4 pages.
GB Search Report (GB1602805.2) dated Jul. 21, 2016, 4 pages.

* cited by examiner

CAMPING ASSEMBLY WITH A STORAGE BOX AND A TENT

CROSS-REFERENCES TO RELATED APPLICATIONS

This application is a continuation of U.S. patent application Ser. No. 15/999,098, filed Aug. 17, 2018, which was the National Stage of International Application No. PCT/GB2017/050391 having an international filing date of Feb. 15, 2017, published in English on Aug. 24, 2017 under PCT Article 21(2) (the entirety of which is incorporated herein by reference), and International Application No. PCT/GB2017/050391 claims the benefit under 35 U.S.C. 119 sections (a)-(d) of GB Application No. 1602806.2 (filed Feb. 17, 2016) and GB Application No, 1612659.1 (filed Jul. 21, 2016), the entireties of which are incorporated herein by reference.

FIELD OF THE INVENTION

The present invention relates to a camping assembly and a method of erecting a camping assembly. In particular, the present invention relates to a folding camper and method of erecting a folding camper.

BACKGROUND TO THE INVENTION

Folding campers provide an alternative to caravans and tents. Folding campers generally comprise a trailer containing a tent canopy which is erected over the trailer to provide an accommodation space. The trailer provides a rigid floor spaced from the ground on which various fixtures and fittings can be supported.

Folding campers thereby provide an alternative to caravans and also provide many advantages over caravans. For example, when a folding camper is folded down, the trailer is significantly more compact than a caravan. A folding camper is, therefore, easier to store and is generally easier and safer to tow. Furthermore, a folding camper is significantly lighter than a caravan and is easier to manoeuvre. However, a folding camper is still able to provide a generally spacious accommodation area compared to a trailer tent or conventional tent.

In addition, the folding camper may provide a support frame on which bikes and other outdoor apparatus can be supported whilst towing. The folding camper provides a trailer when in the towing configuration on which this apparatus can be easily transported.

Folding campers are also cheaper than caravans, campervans and motor homes. Folding campers provide a camping experience but also provide sufficient storage space for fitted fridges, toilets, ovens etc. Accordingly, folding campers provide the equipment and accommodation level similar to a caravan/motor home whilst benefitting from a relatively compact storage and towing size.

Unlike a caravan/motor home, a folding camper must be assembled once located at the pitch. This may involve quite complicated steps including the insertion of poles for the tent canopy and/or the insertion of side panels to form the sides of the accommodation space. This can leave the interior open to the elements during assembly and, subsequently, the fixtures and fittings may get wet and/or damaged during the assembly of the accommodation space.

Furthermore, folding campers generally require a lot of effort in the assembly and this can deter users from using folding campers. Accordingly, the assembly and disassembly of a folding camper can be a time consuming and difficult task which may require more than one person and may also leave the interior temporarily exposed to the elements which can cause any internal (electrical) equipment to be damaged.

In prior art arrangements, the internal fittings may cause the angled tent poles and/or the associated canopy to snag whilst being moved to an assembled configuration. In addition, folding campers may utilise an awning channel whilst being deployed and this requires a part of the canopy to move through this channel. Over time, this can cause wear and tear on the canopy and this can eventually lead to tears or rips within the canopy.

Finally, a canopy of a folding camper also requires guy (guide) ropes to support the flexible canopy and to ensure that the canopy is taut and can withstand the weather and, in particular, high winds. This adds to the complexity and time involved in erecting the folding camper. In addition, these guy (guide) ropes increase the overall footprint of the folding camper and may provide a hazard around the immediate vicinity.

Folding campers and/or a similar camping assembly may be provided on the top of a vehicle, for example on top of a campervan, van or 4×4 vehicle. In addition, a folding camper and/or a similar camping assembly may be provided on the back of a pick up truck. Furthermore, a folding camper and/or a similar camping assembly may be located within a transportation box from which the canopy structure emerges and folds outwardly therefrom. The present invention may be particularly applicable with all of these types of folding campers and/or similar camping assemblies although the present invention is not limited to these specific examples.

It is an aim of the present invention to overcome at least one problem associated with the prior art whether referred to herein or otherwise.

SUMMARY OF THE INVENTION

According to a first aspect of the present invention there is provided a camping assembly comprising a storage box and a tent, wherein the storage box is arranged to contain the tent in a transportation configuration and wherein the tent is arranged to be assembled from the storage box whilst remaining attached to the storage box, the tent comprising a canopy secured to a support structure for supporting the canopy in an assembled configuration;

wherein the support structure comprises a plurality of lateral inflatable support members;

wherein, in the assembled configuration, the box provides a fixed footprint about which the canopy is secured and the support structure tensions the canopy in the assembled configuration; and wherein the canopy is secured to the box in the transportation configuration and the canopy is secured to the box in the assembled configuration such that the canopy remains secured to the storage box as the tent is assembled from the transportation configuration to the assembled configuration.

Preferably the storage box comprises a rigid cover.

The lateral support members extend laterally across the tent (and canopy) and one or more longitudinal support member may extend longitudinally along the tent (and canopy).

Preferably the support structure comprises the plurality of lateral inflatable support members and a single central longitudinal (inflatable) support member.

Preferably the storage box has a longitudinal length extending from a first end to a second end. In an assembled configuration, the lateral support members may extend laterally across the storage box. The camping assembly may comprise a longitudinal support member which, in the assembled configuration, may extend longitudinally along the storage box.

In an assembled configuration, the lateral support members may extend longitudinally along the storage box. The camping assembly may comprise a longitudinal support member which, in the assembled configuration, may extend laterally across the storage box.

The camping assembly may comprise a wheeled vehicle. The wheeled vehicle may be motorised or may be arranged to be towed behind a motor vehicle.

The box may be arranged to be mounted on the roof of a vehicle. The box may be mounted on a van and/or a 4×4 vehicle.

The box may be arranged to be mounted on a rear of a vehicle. The box may be arranged to be mounted on a rear of a pick up style vehicle.

The camping assembly may comprise a folding camper and the folding camper preferably comprises a wheeled rigid trailer providing the box and the box having a longitudinal length extending from a first end to a second end.

The box may be arranged to be transported and a base of the box may be arranged to be supported (directly) on a ground surface.

Preferably the box provides a fixed footprint about which the canopy is secured and preferably the support structure solely tensions the canopy in the assembled configuration.

Preferably the support structure comprises a longitudinal support member. Preferably each lateral inflatable support member is arranged to extend from adjacent to a first lateral side of the storage box to a second lateral side of the storage box.

Preferably the lateral inflatable members comprise lateral airbeams.

The longitudinal support member may comprise a longitudinal inflatable support member. The longitudinal inflatable support member may comprise a longitudinal airbeam.

Preferably the lateral inflatable support members provide a first frame and a second frame.

Preferably the lateral inflatable support members provide a central lateral inflatable support member located between the first frame and the second frame.

Preferably the longitudinal (inflatable) support member extends from the first longitudinal end of the folding camper to the second longitudinal end of the folding camper.

Preferably the longitudinal (inflatable) support member extends centrally along a central line between lateral sides of the folding camper.

Preferably the longitudinal (inflatable) support member is arranged, in an assembled (inflated) configuration, to locate within a substantially vertical plane.

Preferably each lateral inflatable support member provides a single curved lateral support member.

Preferably the longitudinal (inflatable) support member comprises an angled longitudinal support member.

The longitudinal (inflatable) support member may comprise (inflatable) sections spanning/extending between adjacent lateral support members. The longitudinal (inflatable) support member may comprise linear (inflatable) sections spanning/extending between adjacent lateral support members.

The longitudinal (inflatable) support member may provide a curved longitudinal (inflatable) support member.

Preferably the longitudinal (inflatable) support member forms a substantially rigid spine along the length of the canopy in the assembled configuration.

Preferably the lateral inflatable support members form lateral spines across the width of the canopy in the assembled configuration.

Preferably each lateral and/or longitudinal (inflatable) support member is (permanently) attached or remains attached to the canopy in the transportation configuration and in the assembled configuration and remain attached to the canopy as the tents is assembled from the transportation configuration to the assembled configuration.

Preferably the tent assembly (folding camper) comprises a compressor. Preferably the compressor is arranged to inflate each inflatable support member from a stored configuration to an assembled configuration. Preferably the compressor comprises an electric compressor. Preferably the electric compressor comprises a power source. The power source may comprise a leisure battery.

The tent assembly (folding camper) may comprise deflation means to deflate the inflatable support members.

Preferably the deflation means is provided by the compressor. Preferably the compressor draws air from the inflatable support members and this may transform the canopy from the assembled configuration to a collapsed configuration. The tent assembly (folding camper) may comprise a storage compartment for storing a compressor therein. Preferably the storage compartment comprises a cover for concealing and/or accessing the compressor.

Preferably the canopy is solely supported by the (inflatable) support members in an assembled configuration.

Preferably the canopy is maintained in a taut condition solely by the (inflatable) support members.

Preferably each inflatable support member provides a compressed air chamber.

Preferably each inflatable support member comprises an outer sleeve and an inner tube. Preferably the inner tube provides an inflatable chamber for compressed air. Preferably the inner tube provides an inflatable bladder for compressed air.

Each inflatable support member may comprise a series of linked and/or contiguous inner tube sections. Adjacent inner tube sections may be connected together by a connector. The connector may comprise a connecting valve. The connecting valve may comprise a valve switch to selectively connect or isolate the chambers of two adjacent inner tube sections.

Each inner tube section may comprise isolation means to isolate the internal chamber from adjacent inner tube section(s). The isolation means may comprise a valve located at one or both ends of the inner tube section.

The lateral inflatable support members and the longitudinal inflatable support member may provide a single inflatable network. The single inflatable network may be connected to a single inflation means.

Preferably the canopy is fixed around a lower periphery to a rigid periphery provided by the trailer (storage box). The fixed lower periphery may comprise an unfixed (or unsecured or releasable) portion to provide a door opening or access portion or other opening.

Preferably a lower periphery of the canopy is fixed in a static configuration (non-movable) or arrangement to a rigid periphery provided by the trader (storage box).

Preferably a lower periphery of the canopy is fixed and gripped/clamped in a static configuration (non-movable) or arrangement to a rigid periphery provided by the trailer (storage box).

Preferably a lower periphery of the canopy is not movable and may be immovably retained to a rigid periphery provided by the trailer (storage box).

Preferably the trailer (storage box) provides a fixed footprint about which the canopy is secured and the airbeam network (or support structure) solely tensions the canopy in the assembled configuration.

Preferably the fixed footprint comprises a securing periphery to which the canopy is secured. The canopy (and preferably a lower edge of the canopy) may be secured around the complete periphery thereof. The canopy may have one or more releasable sections to release the canopy from the securing periphery and the releasable section may provide an opening(s)/door(s)/window(s)/access portion(s).

Preferably the canopy is fixed around at least a part of the canopy to a part of a rigid periphery provided by the box. Preferably at least a part of the canopy is fixed in a static configuration (non-movable) or arrangement to a rigid portion provided by the box. Preferably at least a part of the canopy is fixed and gripped/clamped in a static configuration (non-movable) or arrangement to a rigid periphery portion provided by the box. Preferably at least a part of the canopy is not movable and may be immovably retained to a rigid portion provided by the box. Preferably the box provides a fixed anchorage to which the canopy is secured and the airbeam network (or support structure) solely tensions the canopy in the assembled configuration and preferably without the use of any rigid and/or semi rigid support poles.

Preferably the rigid cover comprises a first cover section and a second cover section and both cover sections are pivotally connected to the trailer (storage box).

The first cover section and/or the second cover section may be pivotally connected to lateral side(s) of the storage box. A first accommodation area may be arranged to extend outwardly from one or both lateral sides of the storage box.

The first cover section and/or the second cover section may be pivotally connected to the longitudinal sides of the box. A first accommodation area may be arranged to extend outwardly from one or both longitudinal sides of the storage box.

Preferably the rigid cover provides a loading platform in a transit/storage configuration.

Preferably the box has a lateral width extending from a first side to a second side.

Preferably the lateral airbeams extend from the first side to the second side.

Preferably the longitudinal airbeam extends from the first end to the second end.

Preferably the longitudinal airbeam locates centrally midway between the first side and the second side. Preferably in the inflated configuration the longitudinal airbeam locates substantially parallel to the first side and the second side.

Preferably the folding camper comprises a single longitudinal airbeam.

The longitudinal support member may extend between a front (and preferably the front most) lateral support member and a rear (and preferably the rear most) lateral support member. The longitudinal support member may extend between adjacent pairs of lateral support members. The longitudinal support member may comprise sections each of which extends between an adjacent pair of lateral support members.

The longitudinal support member may comprise an uninflatable member.

The longitudinal support member may comprise a tension strap. The tension strap may be adjustable to adjust the tension within the strap. The tension strap may have one or more tension devices which may be located at or towards one or each end thereof. The tension device may comprise a buckle system or a ratchet system. The tension strap may comprise a textile strap.

The longitudinal support member may comprise a rigid pole or a substantially rigid pole. The rigid pole may comprise an adjustable length. The rigid pole may be extendable and retractable. The rigid pole may be telescopic. The rigid pole may comprise a number of sections and the length of each section may be adjustable. Each section may be telescopic.

The longitudinal support member may comprise a flexi pole. The flexi pole may be shaped and/or curved.

Preferably the folding camper comprises a plurality of lateral airbeams. Preferably the folding camper comprises a first frame of lateral airbeams. Preferably the folding camper comprises a second frame of lateral airbeams. Preferably the folding camper comprises a central lateral airbeams which locates between the first frame and the second frame.

The lengths of the lateral airbeams may be different.

Preferably the first frame comprises three lateral airbeams and this may comprise a front airbeam, a middle airbeam and a rear airbeam. The length of each airbeam within the first frame may be different. The length of the front airbeam may be greater than the length of the middle airbeam. The length of the rear airbeam may be greater than the front airbeam and/or the middle airbeam.

Preferably the second frame comprises three lateral airbeams and this may comprise a front airbeam, a middle airbeam and a rear airbeam. The length of each airbeam within the second frame may be different. The length of the front airbeam may be greater than the length of the middle airbeam. The length of the rear airbeam may be greater than the front airbeam and/or the middle airbeam.

Preferably each lateral airbeam within the front frame has two respective longitudinal ends which are permanently fixed to respective front connectors to provide airflow between the airbeams and equalise the pressure within the airbeams and also to synchronise the inflation/deflation of the airbeams.

Preferably each lateral airbeam within the rear frame has two respective longitudinal ends which are permanently fixed to respective rear connectors to provide airflow between the airbeams and equalise the pressure within the airbeams and also to synchronise the inflation/deflation of the airbeams.

Preferably in the assembled configuration, the folding camper comprises three lateral airbeams located in parallel vertical planes which may provide a central accommodation area. Preferably the central accommodation area provides an increased height area compared to end sleeping accommodation areas which may be provide at a front end and at a rear end.

In the assembled configuration, the canopy is solely supported by the support structure such that the height of the tent is provided by the support structure and the lateral and longitudinal stability is provided by the support structure (longitudinal and lateral support members), canopy and footprint securement provided by the storage box.

According to a second aspect of the present invention there is provided a folding camper comprising:
a wheeled rigid trailer comprising a box;
the wheeled rigid trailer comprising a rigid cover;
a canopy secured to a support structure for supporting the canopy in an assembled configuration;
wherein the support structure comprises a plurality of lateral inflatable support members and a longitudinal support member.

Preferably the box has a longitudinal length extending from a first end to a second end.

Preferably the longitudinal support member comprises an inflatable longitudinal support member.

According to a third aspect of the present invention there is provided a method of assembling a camping assembly, the camping assembly comprising:
a storage box and a tent, wherein the storage box is arranged to contain the tent in a transportation configuration and wherein the tent is arranged to be assembled from the storage box whilst remaining attached to the storage box,
the tent comprising a canopy secured to a support structure for supporting the canopy in an assembled configuration;
wherein the support structure comprises a plurality of lateral inflatable support members;
wherein, in the assembled configuration, the box provides a fixed footprint about which the canopy is secured and the support structure tensions the canopy in the assembled configuration; and
wherein the canopy is secured to the box in the transportation configuration and the canopy is secured to the box in the assembled configuration such that the canopy remains secured to the storage box as the tent is assembled from the transportation configuration to the assembled configuration;
the method comprising:
maintaining the canopy secured to the storage box as the tent is assembled from the transportation configuration to the assembled configuration; and
inflating the support structure comprising a plurality of lateral inflatable support members.

Preferably the storage box has a longitudinal length extending from a first end to a second end.

Preferably the method comprises opening the storage box and folding the tent assembly outwardly therefrom.

According to a fourth aspect of the present invention there is provided a method of assembling a folding camper a folding camper, the folding camper comprising:
a wheeled rigid trailer comprising a box;
the wheeled rigid trailer comprising a rigid cover; and
a canopy secured to a support structure for supporting the canopy in an assembled configuration;
the method comprising:
inflating a support structure comprising a plurality of lateral inflatable support members and a longitudinal inflatable support member.

Preferably the box has a longitudinal length extending from a first end to a second end.

Preferably the method comprises solely supporting the canopy with the inflated support structure in an assembled configuration.

Preferably the method comprises solely tensioning the canopy with the inflated support structure in the assembled configuration.

Preferably the method comprises inflating the support structure using a single air inlet valve.

Preferably the method comprises inflating the support structure with an integral compressed air supply. Preferably the method comprises powering the compressed air supply with an integral battery and preferably with a leisure battery.

BRIEF DESCRIPTION OF THE DRAWINGS

The present invention will now be described by way of example only, with reference to the drawings that follow, in which.

DESCRIPTION OF THE PREFERRED EMBODIMENTS

Figure 1:
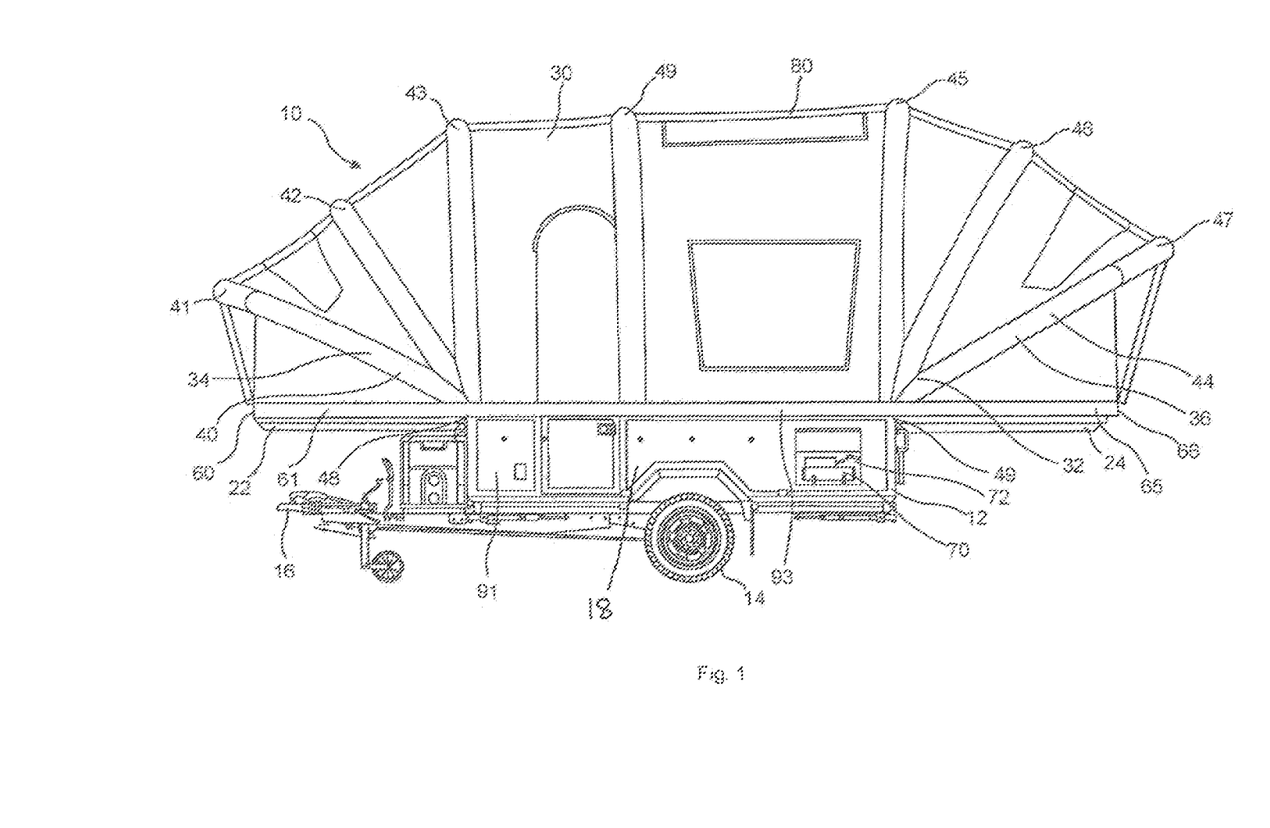
FIG. 1 is a side view of a preferred embodiment of a camping assembly in an assembled configuration.
Figure 2:
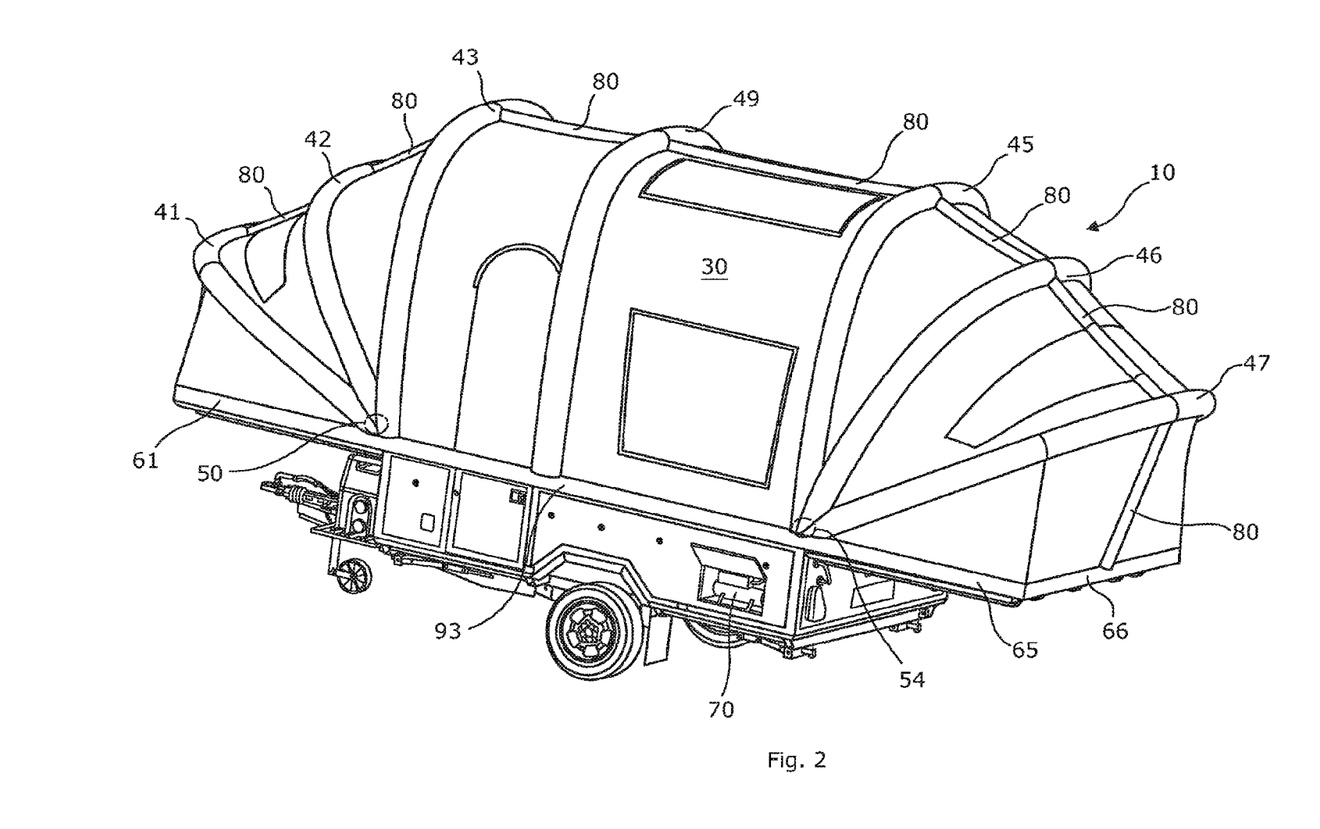
FIG. 2 is a perspective view of a preferred embodiment of a camping assembly in an assembled configuration.

As shown in FIG. 1. FIG. 2. FIG. 3 and FIGS. 4A to 4E, a camping assembly in the form of a folding camper 10 comprises a trailer (storage box) 12 mounted on wheels 14 and includes a tow bar coupling (tow hitch) 16 in order to secure the folding camper to a towing vehicle (not shown). The trailer 12 comprises a rigid box with two side walls and two end walls. The trailer 12 provides a storage box for the tent assembly. The storage box is arranged to store the tent for transportation and storage purposes. The box comprises a rigid box to protect the tent and also enables further apparatus/equipment to be mounted on top of the box, if required.

The term folding camper 10 is used to include a tent which folds outwardly from a storage box and in which the tent remains attached to the box during the assembly process. In addition, the tent canopy is arranged to be solely tensioned and maintained in an assembled configuration by the associated (integral) support structure such that guy ropes or any other similar external tensioning mechanisms are not required. The storage box opens to provide a footprint for the tent in the assembled configuration. In particular, the canopy is secured around an edge of the storage box which thereby defines the (base) footprint for the tent. This footprint may be defined by the lateral edges of the storage box together with the lateral edges 61, 65 of the covers of the storage box and the distal edges of the covers, i.e. the edges of the covers which are spaced from an associated hinge mechanism (or similar articulating/connecting mechanism) between the covers and the storage box 12.

The trailer 12 also comprises a rigid cover comprising a first section and a second section. The first section comprises a rigid front cover section 22 or panel. The rigid front cover section 22 is pivotally connected along one edge (a front edge) to a wall of the box 18 of the trailer 12. Similarly, the second section comprises a rigid rear cover section 24 or panel. The rigid rear cover section 24 is pivotally connected along one edge (a rear edge) to a wall of the box 18 of the trailer 12.

In particular, the rigid front cover section 22 comprises a front bed tray which is arranged to extend out from the box 18 in the assembled configuration in order to provide a solid raised sleeping area or another accommodation area. Similarly, the rigid rear cover section 24 comprises a rear bed tray which is arranged to extend out from the box 18 in the assembled configuration in order to provide a solid raised sleeping area or another accommodation area. The folding camper 10 provides a central accommodation area located between these two sleeping areas.

In the transit/stored configuration, the front cover section 22 and the rear cover section are in a closed position and close an internal space of the box 18. The box 18 thereby securely contains the interior components of the folding camper 10 within an entirely rigid container. In this transit configuration, the upper surface of the trailer provides a platform on which items can be transported. For example, a mounting frame or rack may be used to enable bicycles, kayaks, motorbikes, wet bikes, jet skis etc. to be secured and transported with the trailer 12.

A front top edge of the box 18 comprises a linear hinge 48 which pivotally connects an edge of the front cover section 22. The linear hinge 48 extends along the full length of the connecting edge of the front cover section 22. Accordingly, from the stored configuration, the front cover section 22 can be pivoted over the front edge of the box 18 in order to move from a position in which the front cover section 22 closes the box 18 to a position in which the front cover section 22 extends substantially horizontally outwards from the front edge of the box 18. The folding camper 10 may include reinforcement means in order to retain the front cover section 22 in this (assembled) raised horizontal position. The reinforcement means comprises a front support arm which extends upwardly at an angle from a lower position on the box 18 to the underside of the front cover section 22. The front support arm provides a reinforcement strut, in the preferred embodiment the bed tray provides a double bed sized sleeping area.

The rear cover section 24 is provided in the same way as the front cover section. A front rear edge of the box 18 comprises a linear hinge 49 which pivotally connects an edge of the rear cover section 24. The linear hinge 49 extends along the full length of the connecting edge of the rear cover section 24. Accordingly, from the stored configuration, the rear cover section 24 can be pivoted over the rear edge of the box 18 in order to move from a position in which the rear cover section 24 doses the box 18 to a position in which the rear cover section 24 extends substantially horizontally outwards from the rear edge of the box 18. The folding camper 10 may include reinforcement means in order to retain the rear cover section 24 in this (assembled) raised horizontal position. The reinforcement means comprises a rear support arm which extends upwardly at an angle from a lower position on the box 18 to the underside of the rear cover section 24. The rear support arm provides a reinforcement strut. In the preferred embodiment the bed tray provides a double bed sized sleeping area. Accordingly, the folding camper 10 provides two equally sized double bed sleeping areas at the respective longitudinal ends of the folding camper 10.

Alternative embodiments of the present invention may have unequally sized bed trays/sleeping areas and the associated cover sections may be of unequal sizes.

Figure 3:
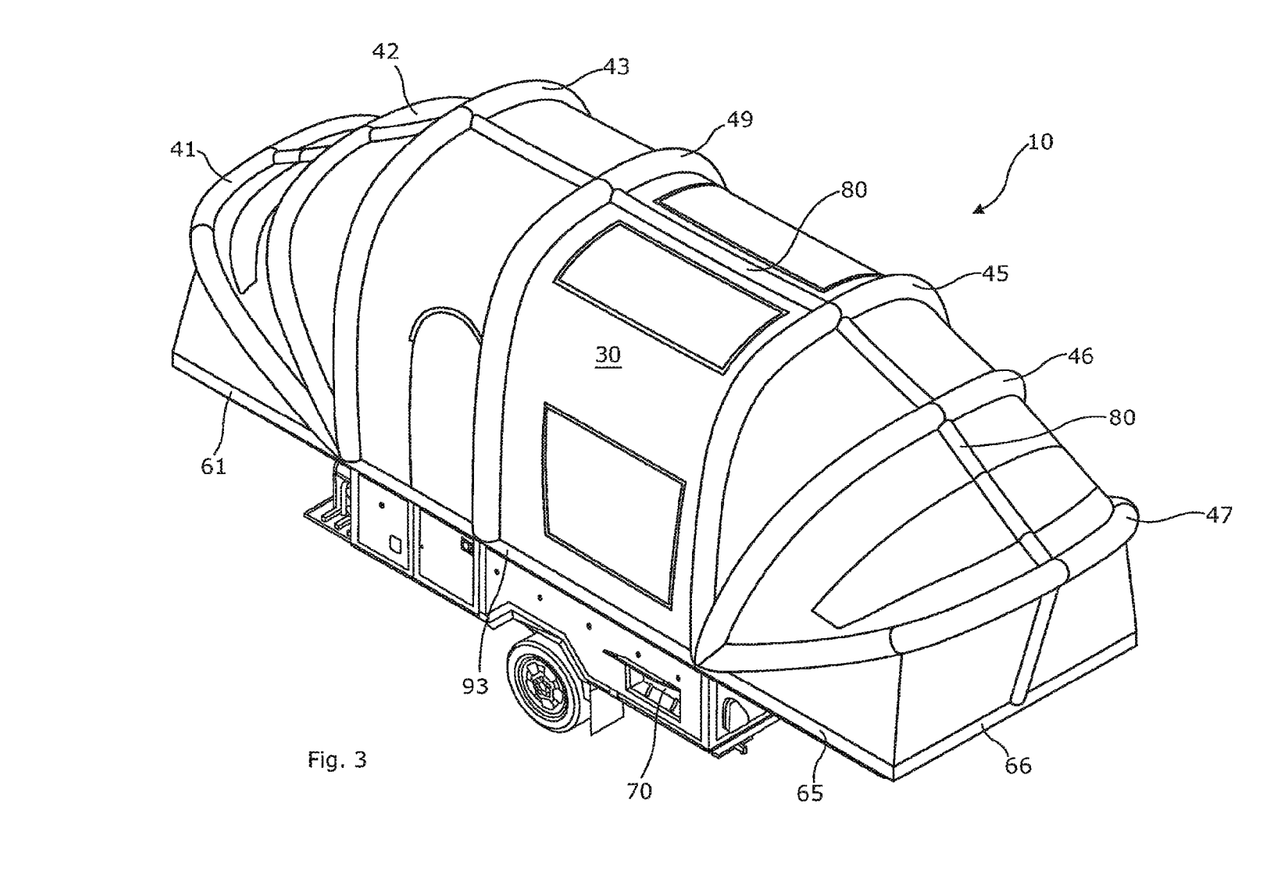
FIG. 3 is a perspective view of a preferred embodiment of a camping assembly in an assembled configuration
Figure 4A:
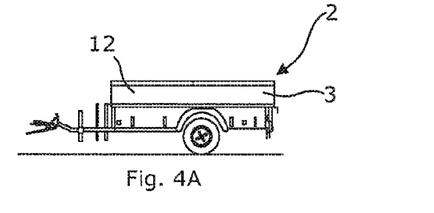
FIG. 4A to FIG. 4E show the assembly sequence of a preferred embodiment of a camping assembly.
Figure 4B:
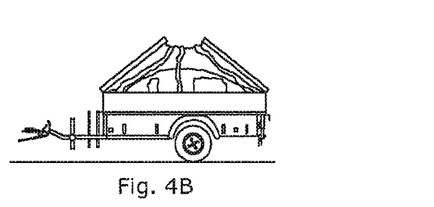
Figure 4C:
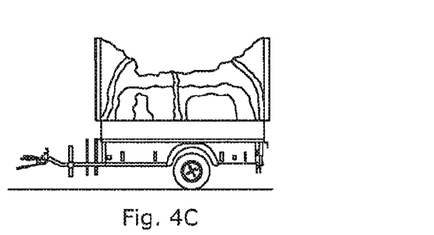
Figure 4D:
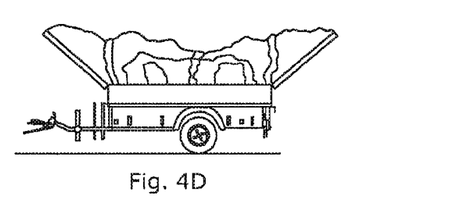
Figure 4E:
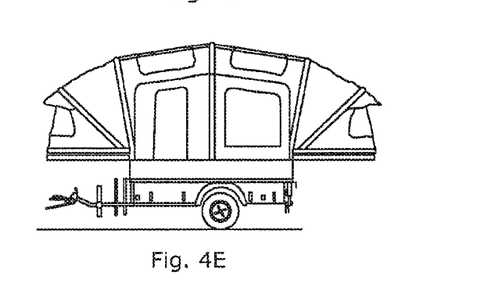
Figure 5A:
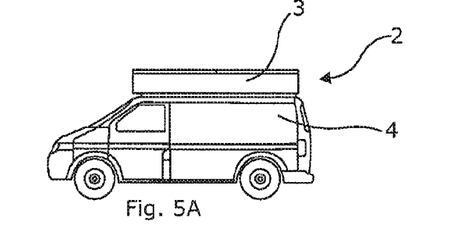
FIG. 5A to FIG. 5E show the assembly sequence of a second preferred embodiment of a camping assembly.
Figure 5B:
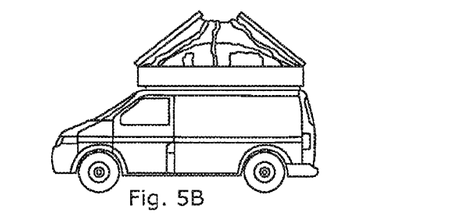
Figure 5C:
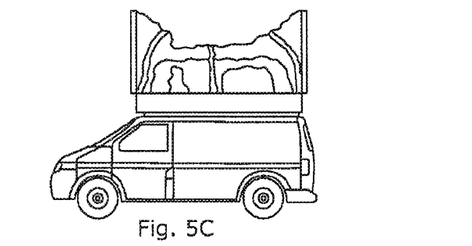
Figure 5D:
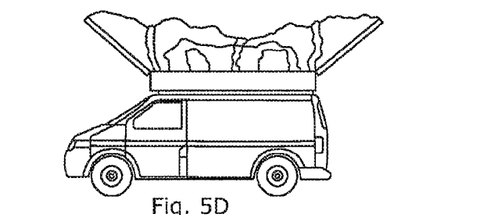
Figure 5E:
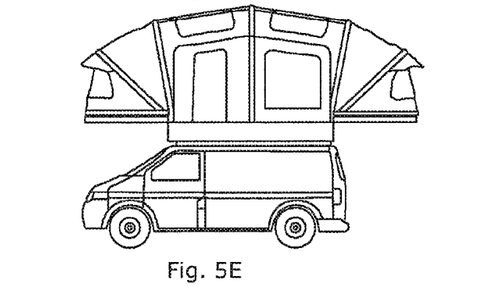
Figure 6A:
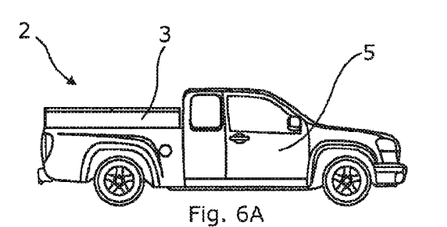
FIG. 6A to FIG. 6E show the assembly sequence of a third preferred embodiment of a camping assembly.
Figure 6B:
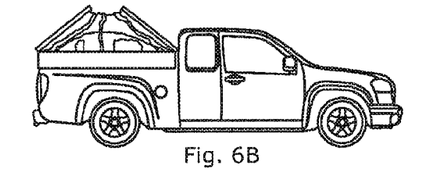
Figure 6C:
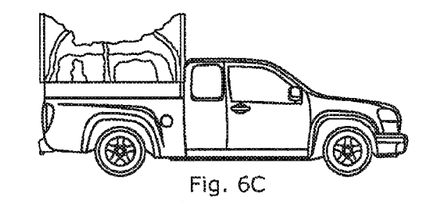
Figure 6D:
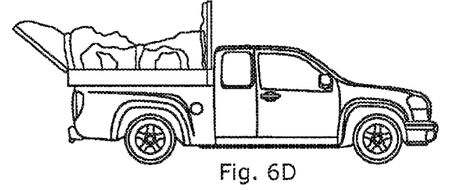
Figure 6E:
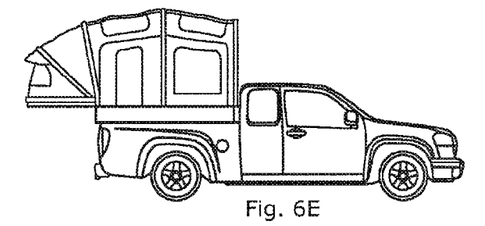
Figure 7A:
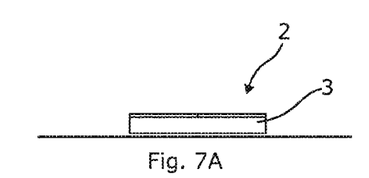
FIG. 7A to FIG. 7E show the assembly sequence of a fourth preferred embodiment of a camping assembly.
Figure 7B:
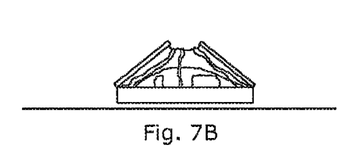
Figure 7C:
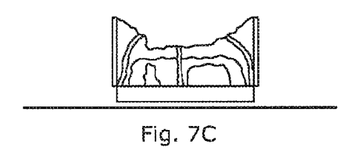
Figure 7D:
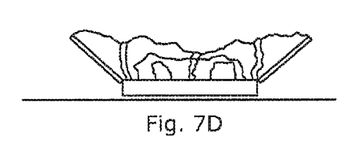
Figure 7E:
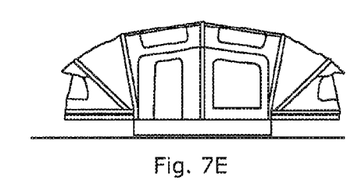

As shown in FIG. 1, FIG. 2 and FIG. 3, the folding camper 10 comprises a canopy 30 which effectively provides a tent canopy 30 for the folding camper 10. The folding camper 10 also comprises a framework 32 (of airbeams) to maintain the tent canopy 30 in a raised configuration in order to provide an accommodation space within the folding camper 10 in the assembled configuration.

The framework 32 includes a front frame 34 and a rear frame 36. The front frame 34 is arranged to raise and maintain the front part of the tent canopy 30 in a raised and elevated position whilst the rear frame 36 is arranged to raise and maintain the rear part of the tent canopy 30 in an elevated and raised position. A central part of the tent canopy 30 is arranged to span between the front frame 34 and the rear frame 36 to provide the central accommodation area.

The front frame 34 comprises a plurality of airbeams 40 and, in the preferred embodiment, the front frame comprises three airbeams 41, 42, 43. The three airbeams include a front airbeam 41, an intermediate airbeam 42 and a rear airbeam 43. Each of the airbeams 41, 42, 43 comprises a curved or hooped inflatable airbeam.

The airbeams 40 of the front frame 34 are all connected or attached to the tent canopy 30 and the airbeams 40 may be substantially integral with the tent canopy 30. The airbeams 40 are arranged, in the assembled configuration, to be spaced apart with a section of the tent canopy 30 extending between adjacent airbeams 40. Accordingly in the assembled configuration, the front frame 40 maintains the tent canopy in a raised position over the front cover section 22. This may provide a first sleeping area.

Similarly, the rear frame 36 comprises a plurality of airbeams 44 and, in the preferred embodiment, the rear frame 36 comprises three airbeams 45, 46, 47.

The three airbeams 45, 46, 47 include a front airbeam 45, an intermediate airbeam 46 and a rear airbeam 47. Each of the airbeams 45, 46, 47 comprises a curved or hooped airbeam.

The airbeam framework/network includes a longitudinal support member 80 in the form of a single central longitudinal airbeam 80 which maintains the canopy on a tensioned and/or taut state in the assembled configuration. This airbeam is provided in sections with individual sections spanning or extending between adjacent lateral airbeams. These sections may be linear between adjacent lateral airbeams. Each section may include an inner tube with a connecting intersection being provided at the junction between the lateral airbeam and the longitudinal airbeam. The longitudinal airbeam 80 thereby retains the separation distances between the lateral airbeams and strengthens the framework/network structure.

The longitudinal airbeam 80 is interconnected with the lateral airbeams such that all of the airbeams are simultaneously inflated and retained at an equal pressure. Without the single longitudinal airbeam 80 the lateral airbeams may have a tendency to be concertinaed together under stress, for example due to winds. The longitudinal airbeam 80 prevents or inhibits such movement.

The airbeams 44 of the rear frame are all connected or attached to the tent canopy and the airbeams 44 may be substantially integral with the tent canopy 30. The airbeams 44 are arranged, in the assembled configuration, to be spaced apart with a section of the tent canopy 30 extending between adjacent airbeams 44. Accordingly in the assembled configuration, the rear frame 36 maintains the tent canopy in a raised position over the rear cover section 24. This may provide a second sleeping area.

A middle section of the tent canopy 30 extends between the rear airbeam 43 of the front frame 40 and the front airbeam 45 of the rear frame 44. This middle section of the tent canopy 30 may provide two opposing side walls and a ceiling for the accommodation area of the folding camper. These wall sections may include window areas and a door(s).

The securement of the frames 34, 36 to the tent canopy 30 is designed to provide an intrinsic tension in the tent canopy 30 such that the material of the tent canopy is held in a naturally taut state as the airbeams are inflated to operating pressure.

The canopy 30 is secured around substantially a full lower periphery to the front cover section 22, the rear cover section 24 and the box 18 and substantially the full lower periphery of the canopy 30 remains attached to securement means as the cover sections move from the storage positions to the assembled positions and the airbeams are subsequently inflated.

The securement means is provided along both lateral sides 91 of the box 18. The securement means is provided adjacent to or towards the upper lateral edges of the box 18. The securement means provides a non-secured section, for example to provide a door space/opening. The securement means provides a continuous fixing of the lower edge of the canopy 30. For example, a lower hemmed edge of the canopy 30 may be gripped, fixed or clamped within a holding or clamping portion/edge. This hemmed fixed edge does not move and is statically fixed. This helps to reduce wear and tear on the canopy fabric. The trailer provides a fixed footprint which is permanently fixed to the lower edge or hem of the canopy. The airbeam network (in the inflated condition) thereby solely provides the intrinsic tension required in the canopy without the requirement of guy ropes or other tensioning fixing components and devices.

The securement means is provided along both lateral sides of the front cover section 22 and the front edge 60 of the front cover section 22. Similarly, the securement means is provided along both lateral sides of the rear cover section 24 and a rear edge 66 of the rear cover section 24.

The lateral sides 91 of the box also provide upper fixing edges 93.

The securement means may comprise a fixed/static securement system. The securement means provides fixed rail/channel provided on the box 18, the first cover section 22 and the rear cover section 24 into which fixing members around the canopy are retained therein. In particular, the lower peripheral edge of the tent canopy 30 includes a rod which is attached at the lower extent. For example, the rod may be provided in a hem of the canopy. Each securement edge of the box 18, the front cover section 22 and the rear cover section 24 comprise an elongate securement channel/rail. The securement system thereby effectively seals the complete interior of the folding camper 10 during assembly, packing and in the assembled state.

Prior art systems may utilise non-fixed systems whereby the canopy is moved into and out of position. This causes the canopy to suffer from significant wear and tear with use and eventually leads to failures.

The airbeams 41, 42, 43 of the front frame 34 extend from a first connector 50 mounted on a first lateral side 91 of the box 18 to a second connector 50 mounted on a second opposite lateral side 91 of the box 18. Each airbeam 41, 42, 43 has two respective longitudinal ends which are permanently fixed to the respective connectors 50. The connectors 50 provide airflow between the airbeams and equalise the pressure within the airbeams and also synchronise the inflation/deflation of the airbeams 41, 42, 43.

The connectors 50 may be provided on brackets mounted adjacent to the front corners of the box 18 and also adjacent to the top edge of the box 18.

The longitudinal ends of the airbeams 41, 42, 43 are fixed to the brackets or connectors 50 such that the airbeams 41, 42, 43 are inflated between the brackets.

The tent canopy 30 is secured at a front edge to an edge of the front cover section 22 which is opposite the hinged edge of the front cover section 22. The tent canopy 30 is also secured to the side edges of the front cover section 22. Accordingly, the front cover section 22 is raised by the inflation of the front airbeams 41, 42, 43 due to the ends of the airbeams 41, 42, 43 being fixed relative to the trailer. Similarly, the rear cover section 24 is raised by the inflation of the rear airbeams 45, 46, 47 due to the ends of the airbeams 45, 46, 47 being fixed relative to the trailer. The inflation of the front airbeams 41, 42, 43 and the rear airbeams 45, 46, 47 causes the central section of the canopy 30 to also be raised. The central lateral airbeam 49 further raises and shape this central section of the canopy 30 to enable a central roof section to be formed.

The airbeams comprise outer sleeves which contain and encompass a respective inner tube which is inflated to provide the required rigidity. The outer sleeve comprises a fabric which is secured to or integral with the fabric of the canopy. For example, the outer sleeve may comprise a section of fabric which is stitched along both lateral edges to provide a passageway for containing an inner tube(s) or bladder.

Each airbeam may comprise a number of inner tubes which are connected together to form a contiguous inner tube for the airbeam. A valve may be provided at each end of each inner tube section. These valves may be opened or closed to allow air to pass therethrough. Accordingly, each inner tube section can be isolated. This can be useful if an inner tube section fails (for example, is punctured or is otherwise leaking). This means that the canopy 30 may still be adequately supported even though one (or more) airbeams (or inner tube sections) is punctured and is deflated. This also enables an inner tube section to be removed and replaced easily. Alternatively, the inner tube section can be repaired.

During assembly, the airbeams are all simultaneously inflated by a single compressed air source. All of the inner tube sections are interconnected and effectively form a single network for the compressed air. This enables a single compressed air source to be used without having to provide numerous inlet valves located around the airbeam structure. Valves may provide a weakness to the integrity of the air pressure and this therefore minimises this risk of failure at these potential weak locations.

In addition, the use of a single air source to supply the complete airbeam network also ensures that the canopy 30 is raised evenly. This is of particular importance with a folding camping 10. Folding campers have many permanently located fixtures and fittings on which the canopy 30 is initially stored and laid on top of and from which the canopy 30 is raised. Such fixtures and fittings provide and cause immovable potential obstructions to the canopy 30 as it is raised. In particular, if the canopy 30 is raised from a first longitudinal end then this will distort the canopy which is then likely to be snagged as the second longitudinal end is raised. Since the canopy 30 is raised automatically with the inflation of the airbeams, the continual inflation of the airbeams may cause the canopy to be ripped on such obstructions. In such an arrangement, it may be necessary to partially inflate some airbeams slowly and then partially inflate other airbeams slowly prior to fully inflating all of the airbeams or to perform a similar inflation sequence. This operation may need to be undertaken in a controlled manner with a user continually monitoring the inflation of the airbeams. Accordingly, such an operation is time consuming and requires several inlet valves and/or several compressed air sources. This problem is not as relevant or significant with a simple tent structure since a tent does not include a permanent floor with fixtures and fittings which act as obstacles.

The single compressed air source is provided by a compressor 70 which is located within a dedicated cabinet 72 or locker provided in a lateral side 91 of the trailer. This compressed air source is connected to, or connectable to, the leisure battery which is used to supply power to the folding camper and/or to any mover system. The compressor 70 is connected to or connectable to the network of airbeams at a single location. In some embodiments, the compressed air source may be permanently attached to the airbeam network. Accordingly, the compressor does not have to be connected to, and disconnected from, the airbeam network. This may decrease the risk of problems with, and failure of, an inlet valve.

To operate, a user can simply switch the compressor on and wait and watch as the airbeam network raises the canopy 30 to the required configuration. The airbeam network and/or compressor may comprise a pressure limiter to prevent over inflation and damage to the airbeam network. Accordingly, the user may not need to carefully monitor and decide when the network is sufficiently inflated.

As mentioned above, during inflation, the airbeams are raised and pivoted into position and then pressurised to fully elevate and raise the tent canopy 30 and to place the tent canopy 30 under the desired tension. This tension of the tent canopy 30 provides taut sides and a taut ceiling section around the complete accommodation area. The present invention does not require any guy (guide) ropes or any other tensioning means and the tent canopy is placed under the desired tension solely by the airbeam structure together with the securement of the canopy around the trailer.

Prior art inflated structures require further tensioning systems which complicates the erection of the structure and provides further mechanisms and components which may fail or interfere with the raising of the canopy. For example, guy (guide) ropes tend to get snagged or wrapped around components during the erection and these need to be carefully monitored during the raising procedure.

The airbeams support the canopy at a height which enables the folding camper 10 to provide an increased accommodation area whilst still enabling the folding camper 10 to be assembled and collapsed into a relatively compact box 18. In particular, the final height of the airbeams 41, 42, 43, 49, 45, 46, 47 is greater than half the longitudinal length of the box 18. For example, the overall length of all the airbeams 41, 42, 43, 49, 45, 46, 47 in the erect/assembled configuration may be 75% of the full length of the box or 150% of the length of the respective cover section.

The use of deflatable airbeams enables the folding camper to provide practically any headroom. A folding camper utilising rigid poles is generally restricted in height due to the folding mechanism of the poles into the trailer and the storage of the rigid poles for transportation. With rigid poles, the height may be restricted to being half the length of the trailer to enable both frames to be pivoted into or out of the trailer and to enable the poles to be stored in the trailer during transportation. Alternatively, the rigid poles may be modular or involve a complicated mechanism to enable the rigid poles to be collapsed into the trailer. Such mechanisms will increase the cost of production, the erection time and are also more likely to fail through use. The present invention thereby provides a simple, easy to use system which is also robust with use.

The airbeams 41, 42, 43, 45, 46, 47 in a frame 40, 44 may have differing lengths and the intermediate airbeam 42, 46 may be shorter than the front airbeam 41, 45 and/or the rear airbeam 43, 47.

The present invention provides deflatable airbeams which enables the accommodation area to be maximised and to also provide a simple and easy packaging method whist maintaining all the interior accommodation area in a covered and sheltered state at all times during the assembly and packaging.

The airbeams 45, 46, 47 of the rear frame 36 extend from a first securement member 54 mounted on a first lateral side 91 of the box 18 to a second securement member mounted (not shown) on a second opposite lateral side of the box 18. Each airbeam 45, 46, 47 has two respective longitudinal ends which are permanently fixed to the respective securement members 54. In the present invention, these securement members orientate the airbeams and direct the inflation of the airbeams.

The securement members 54 comprise brackets mounted adjacent to the rear corners of the box 18 and also adjacent to the top edge of the box 18.

The tent canopy 30 is secured at a rear edge to an edge of the rear cover section 24 which is opposite the hinged edge of the rear cover section 24. The tent canopy 30 is also secured to the side edges of the rear cover section 24. Accordingly, as the rear cover section 24 is pivoted over the rear edge of the box 18, this movement causes the tent canopy 30 to locate in a ready to raise position.

During assembly, the airbeams 45, 46, 47 are simply inflated into position and this action fully elevates and raises the tent canopy 30. This action, together with the simultaneous elevation of the front frame 34, places the tent canopy 30 under the desired tension such that the tent canopy 30 provides taut sides and a taut ceiling section around the central and rear (and front) accommodation areas.

In the fully assembled and erect configuration, as shown in FIG. 1, FIG. 2 and FIG. 3, the tent canopy 30 provides a spacious accommodation area with the lengths of the airbeams and the height of the tent canopy 30 being greater than 50% of the length of the box 18 of the trailer. As previously explained, this is achieved through the use of inflatable airbeams which are easily stored when deflated. The airbeams are in an inflated state for the assembled position and in a deflated (uninflated) state for packaging and storing.

The folding camper 10 in the assembled configuration provides a front accommodation area, a middle accommodation area and a rear accommodation area.

In order to pack and disassemble the folding camper the reverse of the assembly sequence is performed. The compressor 70 may have a suction mechanism or capability such that air can be forced out and withdrawn from the airbeams to provide the deflated configuration with the airbeams in a compact configuration.

This avoids the need for a user to manually squeeze air out of the elongate airbeams which would inevitably be difficult and leave a significant amount of air within the network.

One advantage of the present invention is that the tent section of the folding camper 10 is attached to the top of the box section of the trailer part at all times. As a result of this permanent fixture, it means that when the trailer is opened out (by opening up the two lids that form the end beds) the tent opens out at the same time. This arrangement this makes erection very quick and means that the interior of the camper 10 is always under cover. For example, when arriving at a campsite, the trailer can be opened up with minimal effort and time so that the kids can be inside the camper and not get bored and/or wet.

The large curvature of the airbeams in the present invention is a very distinct feature compared to existing folding campers currently on the market that utilise straight poles with very angular tent construction.

The assembly/erection process (and subsequently the closure) could be done utilizing a single compressor potentially operated by remote control.

Overall the present invention provides a folding camper 10 is arranged to be assembled by simultaneously inflating a single airbeam network to put the canopy 30 in tension and to make the canopy 30 taut. The folding camper 10 does not require any auxiliary tensioning system or mechanism for the canopy since this is provided intrinsically by the connection of the lower edge of the canopy around the trailer and due to the geometry of the airbeam network and, in particular, the central longitudinal airbeam 80. The present invention uses a single airbeam network which simply inflates into position and maintains the interior of the folding camper 10 in a sheltered state. The final assembled height of the accommodation area is maximised through the use of deflatable airbeams which can be easily stored in the box 18.

As mentioned above, the preferred embodiment comprises curved/arcuate or hooped airbeams (lateral and/or longitudinal) since angled airbeams have a tendency to snag on the internal fixtures when erecting. Naturally this is not an issue with an awning or ground tent as there are no internal fittings on initial set up, but when on a folding camper it is a problem as internal fitting are ever present. The curved/hooped air poles inflate more evenly and rise in more uniformed manner, minimising snagging.

Also, unlike awnings and tents, a folding camper has no guy ropes and does not need pegging out, so our air tent design is anchored around the periphery of the trailer instead of being pegged out. However, with our hooped pole style of tent we have found that the design necessitates having to be pegged out to create tension in the roof. We have overcome this by incorporating a ridge pole into our design to negate it requiring pegging out to facilitate the tension in the roof.

Existing fixed pole design camper trailers require the tent to move in an awning channel when deploying, the canopy (awning) of the present invention can be static making it less susceptible to wear & tear.

Overall the hooped tent design maximizes internal volume, as well as maximising effectiveness against high winds as it is more aerodynamic. This is necessary as, unlike an awning, the tent is not supported by a solid structure from one side, and unlike a ground tent is not pegged out with guy ropes.

Integrating a compressor & power source into the trailer of the present invention means that cumbersome stand alone units don't have to be used to inflate the tent.

The chambers/sleeves for the air poles/chambers are stitched and/or integral with the main canopy along the full length.

In the preferred embodiment, the chambers of the airbeams all flow into each other at the intersections, to form cross shaped intersections.

The present invention uses a single compressor connector and inter-connectors which link all the air poles to enable all the air poles to be simultaneously inflated. Preferably the compressor will provide compressed air to a single inlet for the air pole framework The airbeams include inner tubes which locate in sleeves to provide the air poles/airbeams. There are a number of inner tubes linked together by valve connectors to form each air pole/airbeam. At the interconnecting sections, i.e. where the three lateral air poles appear to converge, there is a valve connector which links all the air poles to enable all the air poles to be simultaneously inflated. The valve connectors enable a particular section to be isolated if a leak/puncture occurs.

The canopy remains permanently secured to the storage box as the tent is assembled from the transportation configuration to the assembled configuration (and vice versa, i.e. from the assembled configuration back to the storage configuration). Specifically the canopy is secured to the box in the transportation configuration and the canopy is secured to the box in the assembled configuration such that the canopy (always/permanently) remains secured to the storage box as the tent is assembled from the transportation configuration to the assembled configuration.

In the assembled configuration the tent comprises a tensegrity structure. In particular (in the assembled configuration), the lateral inflatable members together with the canopy provide a stable three-dimensional structure without any external structural components required to provide the required structural stability, i.e. guy ropes etc. are not a requirement.

As shown in FIGS. 4, 5, 6 and 7 the folding camper or camping assembly 2 may be arranged for use with different transportation and methods and configurations.

FIG. 4A to 4E show the assembly sequence for a camping assembly 2/folding camper 10 comprising a trailer which is arranged to be towed behind a motor vehicle.

FIG. 5A to 5E show the assembly sequence for a tent assembly 2 in which the storage box 3 is located on the roof of a van 4. The tent is arranged to fold outwardly from the roof of the vehicle 4 and operates in the same manner previously described above.

FIG. 6A to 6E show the assembly sequence for a tent assembly 2 in which the storage box is provided or mounted to the rear of a pick up truck 5. In this embodiment, only one of the cover folds out completely to provide a horizontal support surface. The other cover is arranged to pivot upwardly to a vertical position. The storage box 3 still provides a footprint but additionally provides a wall in this embodiment.

FIG. 7A to 7E shows the assembly sequence for a tent assembly 2 provided in a discrete box. The storage 3 box is located and supported directly on the ground. As above, the tent and the associated integral support structure concertina and fold outwardly form the box 3 and the box 3 subsequently provides the base footprint of the assembled tent.

The longitudinal support member 80 may be provided in different formats as shown in FIGS. 8 to 11.

Figure 8A:
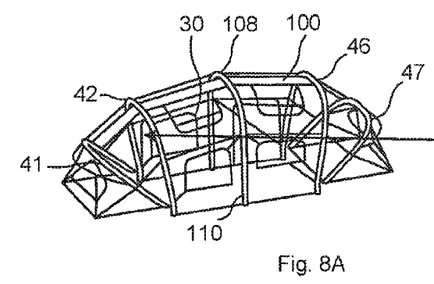
FIG. 8A and FIG. 8B show a part of an embodiment of the tent in an assembled configuration.
Figure 8B:
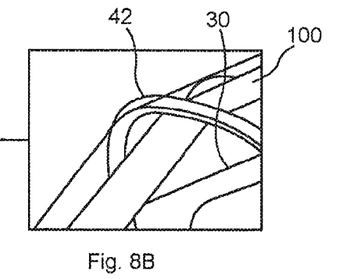

FIG. 8A and FIG. 8B show a longitudinal support member 80 in the form of a tension strap 100 which is secured to the canopy 30 in order to help provide the required tension in the assembled canopy 30. The tension strap 100 may comprise a textile strap which extends in a longitudinal direction and in a central position between the front airbeam 41 of the front frame 34 and the rear airbeam 47 of the rear frame 36. The tension strap 100 may have one or more tension devices or mechanism to adjust the tension within the strap 100. For example, the tension strap 100 may be engaged with a buckle which is attached to an edge of the box 3. The tension strap 100 may have such a tension mechanism at each end thereof.

Alternatively, the necessary tension for the canopy 30 may be provided intrinsically by the material of the canopy 30 itself. The canopy 30 may also be tensioned in an adjustable way to the edge of the box 3 to alter the tension. The tension may help to maintain the space between the lateral support members and maintain the canopy 30 in a taut configuration.

Figure 9A:
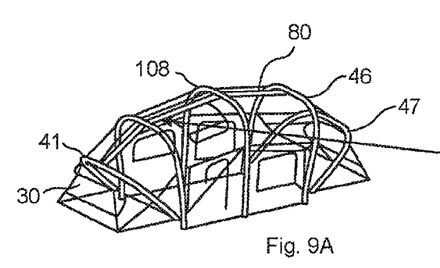
FIG. 9A and FIG. 9B show a part of another embodiment of the tent in an assembled configuration.
Figure 9B:
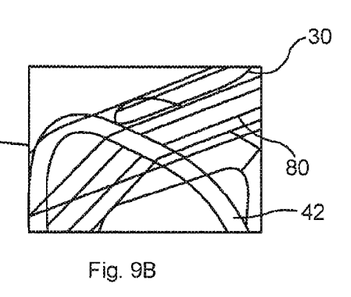

FIGS. 9A and 9B show the longitudinal support member 80 in the form of an air pole or air beam 80 which is secured to the canopy 30 in order to help provide the required tension in the assembled canopy 30. The air beam 80 extends in a longitudinal direction and in a central position between the front airbeam 41 of the front frame 34 and the rear airbeam 47 of the rear frame 36. The air beam 80 is simply inflated to provide the required tension along the spine of the tent canopy 30.

Figure 10A:
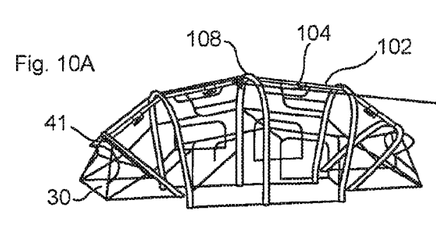
FIG. 10A and FIG. 10B show a part of a further embodiment of the tent in an assembled configuration.
Figure 10B:
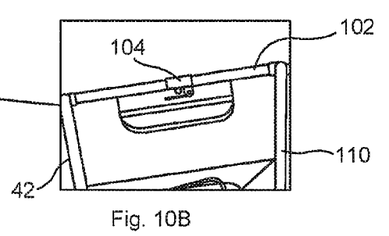

FIGS. 10A and 10B show the longitudinal support member 80 in the form of a rigid pole 102 which is secured to the canopy 30 in order to help provide the required tension in the assembled canopy 30. The rigid pole 102 extends in a longitudinal direction and in a central position between the front airbeam 41 of the front frame 34 and the rear airbeam 47 of the rear frame 36. The rigid pole 102 may be formed in sections which extend between adjacent lateral air beams. The length of each section may be adjustable in order to maintain the correct tension and spacing between the lateral air beams. Each section may comprise a telescopic pole section including a clamping mechanism 104 to control the telescopic operation.

Figure 11A:
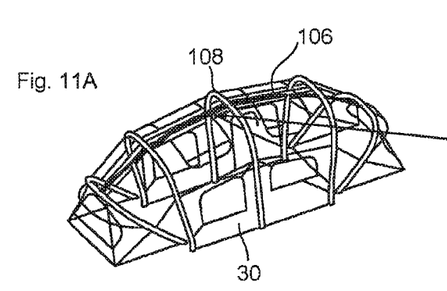
FIG. 11A and FIG. 11B show a part of a yet further embodiment of the tent in an assembled configuration.
Figure 11B:
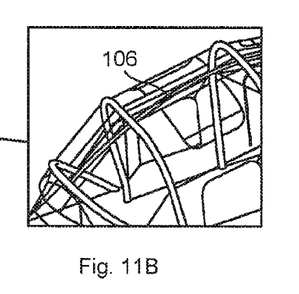

FIGS. 11A and 11B show the longitudinal support member 80 in the form of a flexi pole 106 which is secured to the canopy 30 in order to help provide the required tension in the assembled canopy 30. The flexi pole extends in a longitudinal direction and in a central position between the front airbeam 41 of the front frame 34 and the rear airbeam 47 of the rear frame 36. The flexi pole 106 may be collapsible in sections for transportation/storage purposes. The flexi pole 106 may comprise a fibreglass tent pole.

As shown in FIGS. 8 to 11, the number of lateral support members may be altered. The support structure may comprise two lateral support members 41, 42 in the front frame 40 and two lateral support members 46, 47 in the rear frame 44. The support structure may include one (single) or more (a plurality) central lateral support members 108. This central lateral support member 108 may help to provide the required or desired height in the middle section of the tent.

Figure 12:
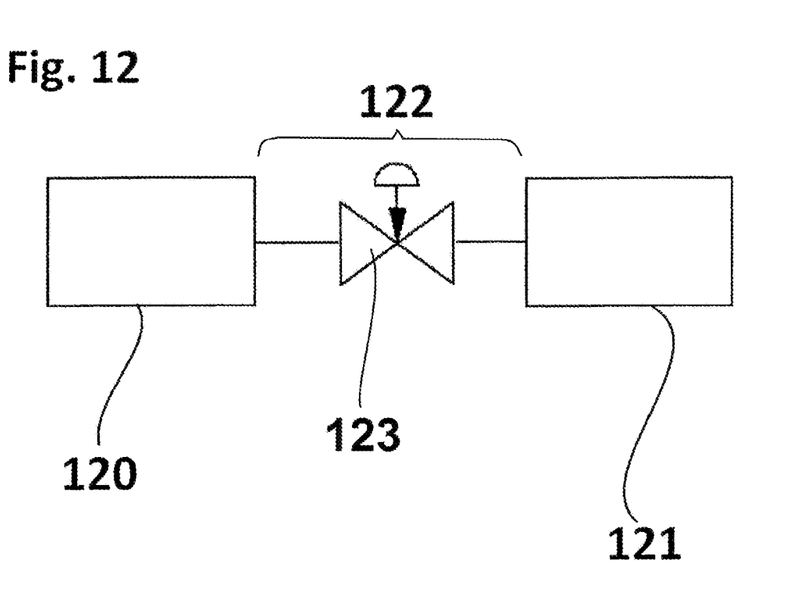
FIG. 12 schematically depicts adjacent inner tube sections 120, 121 connected together by a connector 122 comprising a connecting valve.

FIG. 12 schematically depicts adjacent inner tube sections 120, 121 connected together by a connector 122 comprising a connecting valve 123.

In some embodiments the bed sections (and covers etc.) may open from the sides rather than the ends of the trailer tub (storage box). Furthermore some embodiments may have a single rather than a double fold out mechanism. The terms longitudinal and lateral are hereby made with reference to the extent and direction of the assembled tent such that the lateral support members extend across the tent and the longitudinal extends along the main length of the tent.

The invention claimed is:

1. A camping assembly comprising a storage box and a tent, wherein the storage box is arranged to contain the tent in a transportation configuration and wherein the tent is arranged to be assembled from the storage box whilst remaining attached to the storage box,
the storage box comprising a first longitudinal side and a second longitudinal side;
the storage box comprising a tow bar coupling on the first longitudinal side of the storage box;
a rigid cover comprising a first cover section and a second cover section, the first cover section and the second cover section each pivotally connected to a respective one of the first and second longitudinal sides of the storage box;
an accommodation area is arranged to extend outwardly from one or both longitudinal sides of the storage box;
the tent comprising a canopy secured to a support structure for supporting the canopy in an assembled configuration;
wherein the support structure comprises a plurality of lateral inflatable support members and in which, in the assembled configuration, the lateral inflatable support members extend laterally across the canopy;
the lateral inflatable support members provide a first frame and a second frame;
each lateral inflatable support member within the first frame provides airflow between at least the lateral inflatable support members within the first frame, and equalises the pressure within at least the lateral inflatable support members within the first frame, and also synchronises the inflation/deflation of at least the lateral inflatable support members within the first frame, and
each lateral inflatable support member within the second frame provides airflow between at least the lateral inflatable support members within the second frame, and equalises the pressure within at least the lateral inflatable support members within the second frame, and also synchronises the inflation/deflation of at least the lateral inflatable support members within the second frame;
wherein, in the assembled configuration, the box provides a fixed footprint about which the canopy is secured and the support structure tensions the canopy in the assembled configuration; and
wherein the canopy is secured to the box in the transportation configuration and the canopy is secured to the box in the assembled configuration such that the canopy remains secured to the storage box as the tent is assembled from the transportation configuration to the assembled configuration.

2. A camping assembly according to claim 1 in which lengths of the lateral inflatable support members and a height of the tent canopy in the assembled configuration is greater than 50% of a length of the storage box.

3. A camping assembly according to claim 1 in which, in the assembled configuration, the camping assembly comprises three lateral inflatable support members located in parallel vertical planes which provide a central accommodation region.

4. A camping assembly according to claim 3 in which the central accommodation region provides an increased height area compared to at least a first end region of the accommodation area, the first end region being provided at the first longitudinal side of the camping assembly.

5. A camping assembly according to claim 1 in which the support structure comprises a longitudinal support member.

6. A camping assembly according to claim 5 in which the longitudinal support member comprises a longitudinal inflatable support member.

7. A camping assembly according to claim 5 in which each lateral inflatable support member and the longitudinal support member remains attached to the canopy in the transportation configuration and in the assembled configuration and remain attached to the canopy as the tent is assembled from the transportation configuration to the assembled configuration.

8. A camping assembly according to claim 1 in which the camping assembly comprises a compressor and wherein the compressor is arranged to inflate each inflatable support member from a stored configuration to an assembled configuration.

9. A camping assembly according to claim 8 in which the compressor comprises an electric compressor and also comprises a power source.

10. A camping assembly according to claim 8 in which the camping assembly comprises a storage compartment for storing the compressor therein and in which the storage compartment comprises a cover for concealing and/or accessing the compressor.

11. A camping assembly according to claim 1 in which the camping assembly comprises deflation means to deflate the inflatable support members.

12. A camping assembly according to claim 11 in which the deflation means is provided by a compressor.

13. A camping assembly according to claim 1 in which the lateral inflatable support members and a longitudinal inflatable support member provide a single inflatable network.

14. A camping assembly according to claim 1 in which the canopy is fixed around a lower periphery to a rigid periphery provided by the storage box.

15. A camping assembly according to claim 14 in which at least a part of the canopy is fixed and gripped/clamped in a static configuration to a rigid periphery portion provided by the box and the at least part of the canopy is immovably retained to a rigid portion provided by the box.

16. A camping assembly according to claim 1 in which the camping assembly comprises a towing vehicle coupled to the tow bar coupling.

17. A camping assembly according to claim 1 in which the first frame comprises at least two lateral inflatable support members comprising a front lateral inflatable support member and a rear lateral inflatable support member and in which the length of the rear lateral inflatable support member is greater than the length of the front lateral inflatable support member, and in which the second frame comprises at least two lateral inflatable support members comprising a front lateral inflatable support member and a rear lateral inflatable support member and in which the length of the rear lateral inflatable support member is greater than the front lateral inflatable support member.

18. A camping assembly according to claim 1 wherein each lateral inflatable support member extends from a first lateral side of the storage box to a second lateral side of the storage box.

19. A camping assembly comprising a storage box and a tent, wherein the storage box is arranged to contain the tent in a transportation configuration and wherein the tent is arranged to be assembled from the storage box whilst remaining attached to the storage box, an accommodation area is arranged to extend outwardly from one or both longitudinal sides of the storage box;

the tent comprising a canopy secured to a support structure for supporting the canopy in an assembled configuration;

wherein the support structure comprises a plurality of lateral inflatable support members and in which, the assembled configuration, the lateral inflatable support members extend laterally across the canopy;

the lateral inflatable support members provide a first frame and a second frame;

each lateral inflatable support member within the first frame provides airflow between at least, the lateral inflatable support members within the first frame, and equalises the pressure within at least the lateral inflatable support members within the first frame, and also synchronises the inflation/deflation of at least the lateral inflatable support members within the first frame, and each lateral inflatable support member within the second frame provides airflow between at least the lateral inflatable support members within the second frame, and equalises the pressure within at least the lateral inflatable support members within the second frame, and also synchronies the inflation/deflation of at least the lateral inflatable support members within the second frame;

wherein, in the assembled configuration, the box provides a fixed footprint about which the canopy is secured and the support structure tensions the canopy in the assembled configuration;

wherein the canopy is secured to the box in the transportation configuration and the canopy is secured to the box in the assembled configuration such that the canopy remains secured to the storage box as the tent is assembled from the transportation configuration to the assembled configuration; and wherein each lateral inflatable support member comprises a series of linked contiguous inner tube sections and adjacent inner tube sections are connected together by a connector comprising a connecting valve and wherein the connecting valve comprises a valve switch to selectively connect or isolate chambers of two adjacent inner tube sections.

20. A camping assembly comprising a storage box and a tent, wherein the storage box is arranged to contain the tent in a transportation configuration and wherein the tent is arranged to be assembled from the storage box whilst remaining attached to the storage box, an accommodation area is arranged to extend outwardly from one or both longitudinal sides of the storage box;

the tent comprising a canopy secured to a support structure for supporting the canopy in an assembled configuration;

wherein the support structure comprises a plurality of lateral inflatable support members and in which, the assembled configuration, the lateral inflatable support members extend laterally across the canopy;

the lateral inflatable support members provide a first frame and a second frame;

each lateral inflatable support member within the first frame provides airflow between at least, the lateral inflatable support members within the first frame, and equalises the pressure within at least the lateral inflatable support members within the first frame, and also synchronises the inflation/deflation of at least the lateral inflatable support members within the first frame, and each lateral inflatable support member within the second frame provides airflow between at least the lateral inflatable support members within the second frame, and equalises the pressure within at least the lateral inflatable support members within the second frame, and also synchronies the inflation/deflation of at least the lateral inflatable support members within the second frame;

wherein, in the assembled configuration, the box provides a fixed footprint about which the canopy is secured and the support structure tensions the canopy in the assembled configuration;

wherein the canopy is secured to the box in the transportation configuration and the canopy is secured to the box in the assembled configuration such that the canopy remains secured to the storage box as the tent is assembled from the transportation configuration to the assembled configuration; and wherein the first frame comprises three lateral inflatable support members comprising a front lateral inflatable support member, a middle lateral inflatable support member and a rear lateral inflatable support member and in which the length of the front lateral inflatable support member is greater than the length of the middle lateral inflatable support member and the length of the rear lateral inflatable support member is greater than the front lateral inflatable support member and the middle lateral inflatable support member.

21. A camping assembly according to claim 20 in which each lateral inflatable support member within the first frame has two respective longitudinal ends which are permanently fixed to respective front connectors to provide airflow between the lateral inflatable support members and equalise the pressure within the lateral inflatable support members and also to synchronise the inflation/deflation of the lateral inflatable support members.

22. A camping assembly according to claim 20 in which the second frame comprises three lateral inflatable support members comprising a front lateral inflatable support member, a middle lateral inflatable support member and a rear lateral inflatable support member and in which the length of the front lateral inflatable support member is greater than the length of the middle lateral inflatable support member and the length of the rear lateral inflatable support member is greater than the front lateral inflatable support member and the middle lateral inflatable support member.

23. A camping assembly according to claim 22 in which each lateral inflatable support member within the second frame has two respective longitudinal ends which are permanently fixed to respective rear connectors to provide airflow between the lateral inflatable support member and equalise the pressure within the lateral inflatable support member and also to synchronise the inflation/deflation of the lateral inflatable support member.

24. A method of assembling a camping assembly, the camping assembly comprising:
a storage box and a tent, wherein the storage box is arranged to contain the tent in a transportation configuration and wherein the tent is arranged to be assembled from the storage box whilst remaining attached to the storage box,
the storage box comprising a first longitudinal side and a second longitudinal side;
the storage box comprising a tow bar coupling on a first longitudinal side of the storage box;
a rigid cover comprising a first cover section and a second cover section, the first cover section and the second cover section each pivotally connected to a respective one of the first and second longitudinal sides of the storage box;
an accommodation area is arranged to extend outwardly from one or both longitudinal sides of the storage box;
the tent comprising a canopy secured to a support structure for supporting the canopy in an assembled configuration;
wherein the support structure comprises a plurality of lateral inflatable support members and in which, in an assembled configuration, the lateral support members extend laterally across the canopy;
the lateral inflatable support members provide a first frame and a second frame;
each lateral inflatable support member within the first frame provides airflow between at least the lateral inflatable support members within the first frame, and equalises the pressure within at least the lateral inflatable support members within the first frame, and also synchronises the inflation/deflation of at least the lateral inflatable support members within the first frame, and
each lateral inflatable support member within the second frame provides airflow between at least the lateral inflatable support members within the second frame, and equalises the pressure within at least the lateral inflatable support members within the second frame, and also synchronises the inflation/deflation of at least the lateral inflatable support members in the second frame;
wherein, in the assembled configuration, the box provides a fixed footprint about which the canopy is secured and the support structure tensions the canopy in the assembled configuration; and
wherein the canopy is secured to the box in the transportation configuration and the canopy is secured to the box in the assembled configuration such that the canopy remains secured to the storage box as the tent is assembled from the transportation configuration to the assembled configuration;
the method comprising:
maintaining the canopy secured to the storage box as the tent is assembled from the transportation configuration to the assembled configuration; and
inflating the support structure comprising the plurality of lateral inflatable support members.

\* \* \* \* \*